(12) United States Patent
Pendergraft

(10) Patent No.: US 12,546,288 B1
(45) Date of Patent: Feb. 10, 2026

(54) MULTI-DIRECTIONAL WIND POWER GENERATION

(71) Applicant: Durard A. Pendergraft, Seneca, MO (US)

(72) Inventor: Durard A. Pendergraft, Seneca, MO (US)

( * ) Notice: Subject to any disclaimer, the term of this patent is extended or adjusted under 35 U.S.C. 154(b) by 0 days.

(21) Appl. No.: 18/639,510

(22) Filed: Apr. 18, 2024

Related U.S. Application Data

(60) Provisional application No. 63/460,795, filed on Apr. 20, 2023.

(51) Int. Cl.
| | |
|---|---|
| *F03D 9/25* | (2016.01) |
| *F03D 3/00* | (2006.01) |
| *F03D 9/11* | (2016.01) |
| *H02K 7/18* | (2006.01) |
| *H02K 11/00* | (2016.01) |
| *H02K 13/00* | (2006.01) |

(52) U.S. Cl.
CPC ............ *F03D 9/25* (2016.05); *F03D 3/005* (2013.01); *F03D 9/11* (2016.05); *H02K 7/183* (2013.01); *H02K 11/0094* (2013.01); *H02K 13/003* (2013.01)

(58) Field of Classification Search
CPC ... F03D 9/25; F03D 9/11; F03D 3/005; H02K 7/183; H02K 11/0094; H02K 13/003
See application file for complete search history.

(56) References Cited

U.S. PATENT DOCUMENTS

| | | |
|---|---|---|
| 5,501,101 A | 3/1996 | Purcell |
| 6,172,429 B1 * | 1/2001 | Russell ............... F03D 13/20 290/55 |
| 7,339,286 B1 | 3/2008 | Chen |
| 8,129,855 B1 | 3/2012 | Tong et al. |
| 8,344,539 B1 | 1/2013 | Wilson |
| 9,366,234 B2 | 6/2016 | Sanchez et al. |
| 9,515,516 B2 | 12/2016 | Baker |
| 9,759,194 B2 | 9/2017 | Tucciarone |
| 11,231,084 B2 | 1/2022 | Stryker et al. |
| 2009/0167027 A1 * | 7/2009 | Kato ................. F03D 9/25 416/223 R |
| 2017/0051720 A1 * | 2/2017 | Grigg ................. F03D 3/005 |
| 2018/0100484 A1 * | 4/2018 | Deioma ............. F03D 3/061 |

* cited by examiner

*Primary Examiner* — Sean Gugger
(74) *Attorney, Agent, or Firm* — Cramer Patent & Design, PLLC.; Aaron R. Cramer

(57) ABSTRACT

The present device relates to a wind generator designed for efficient energy production. This wind generator includes a vertical support structure secured to a base, with a rotatable shaft that features an upper and a lower half. Each half of the shaft supports a vane capable of capturing wind to rotate its respective shaft half. The rotation of the shaft drives a generator, which converts the mechanical energy into electrical energy, subsequently stored in a battery. This setup allows for the enhanced capture and utilization of wind energy, and the modular design of the vanes and shafts facilitates both maintenance and scalability of the device, making it suitable for various sizes and applications.

1 Claim, 5 Drawing Sheets

MULTI-DIRECTIONAL WIND POWER GENERATION

RELATED APPLICATIONS

The present device was first described in and is a continuation of U.S. Provisional Application No. 63/460,795, filed Apr. 20, 2023, the entire disclosures of which are incorporated herein by reference.

FIELD OF THE DEVICE

The presently disclosed subject matter is directed towards renewable energy generation devices, specifically wind generators that are adaptable for both small-scale (such as desktop) and large-scale applications. This invention pertains to the field of wind turbines engineered to maximize energy capture through innovative design features that enhance rotational efficiency and energy conversion, offering an alternative energy solution that is both scalable and efficient in various environmental settings.

BACKGROUND OF THE DEVICE

Wind energy has emerged as a crucial part of the global renewable energy portfolio, driven by the need for sustainable and environmentally friendly power sources. Traditional wind turbines often face limitations regarding efficiency, particularly in variable wind conditions and smaller, non-industrial settings. There is a continuous demand for wind energy devices that can operate effectively across a broad range of conditions and scales. The current invention addresses these challenges by introducing a novel wind generator design that incorporates dual, independently rotating vanes on a compact and adjustable frame, aimed at optimizing the capture and conversion of wind energy into electrical power. This approach not only increases the practical applicability of wind turbines in less conventional settings but also improves the overall energy efficiency of these devices.

SUMMARY OF THE DEVICE

Embodiments of the present disclosure may include a wind generator, including a base. Embodiments may also include a vertical support structure mounted on the base. Embodiments may also include a rotating shaft including an upper half and a lower half. In some embodiments, the upper half may be rotatably connected to the vertical support structure and the lower half may be rotatably connected to the base.

Embodiments may also include a first vane attached to the lower half of the rotating shaft and a second vane attached to the upper half of the rotating shaft. In some embodiments, each vane may be configured to capture wind flow and rotate the respective shaft half. Embodiments may also include a generator coupled to the rotating shaft for converting mechanical rotation into electrical energy. Embodiments may also include a battery connected to the generator for storing the electrical energy.

In some embodiments, the base may be generally planar and includes an upper surface and a lower surface, the lower surface including support feet. Embodiments may also include each of the first vane and the second vane includes a first half that may be semicircular. Embodiments may also include a second half that may be semicircular. In some embodiments, each half of the vanes includes a capture feature on its flattened side configured to capture wind flow.

In some embodiments, the generator includes a set of moving magnets attached to the rotating shaft and multiple coils in electrical communication with the battery. In some embodiments, the wind generator may include wiring connecting the generator to the battery. Embodiments may also include a slip ring located at a junction of the vertical support structure and the upper half of the rotating shaft. In some embodiments, the slip ring facilitates electrical connectivity while allowing rotation.

In some embodiments, the vertical support structure includes a pair of uprights extending from the base. Embodiments may also include a top frame spanning between the top ends of the uprights. In some embodiments, the wind generator may include an extension projecting from the top frame. In some embodiments, the upper half of the rotating shaft may be rotatably attached to the extension.

In some embodiments, the first vane may be mounted on the shaft lower half to rotate in a first direction and the second vane may be mounted on the shaft upper half to rotate in a second direction opposite to the first direction. In some embodiments, the first vane and the second vane may be vertically adjustable along their respective shaft halves to enhance the efficiency of wind flow capture. In some embodiments, the base, vertical support structure, rotating shaft, vanes, generator, and battery may be configured as a desktop device capable of being upscaled to larger sizes.

DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
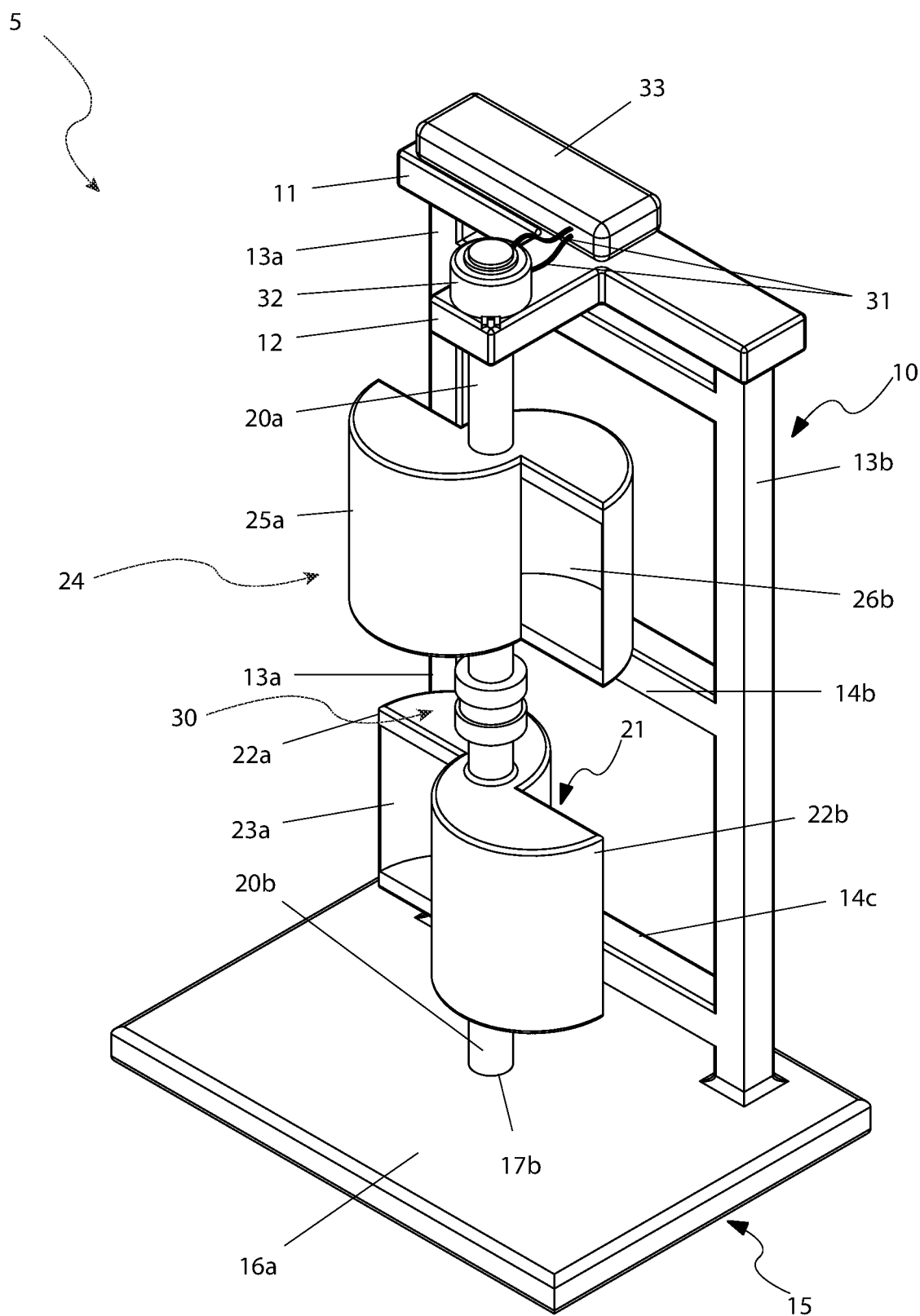
FIG. 1 is a top front right perspective view of a wind generator 5, according to a preferred embodiment of the present device.
Figure 2:
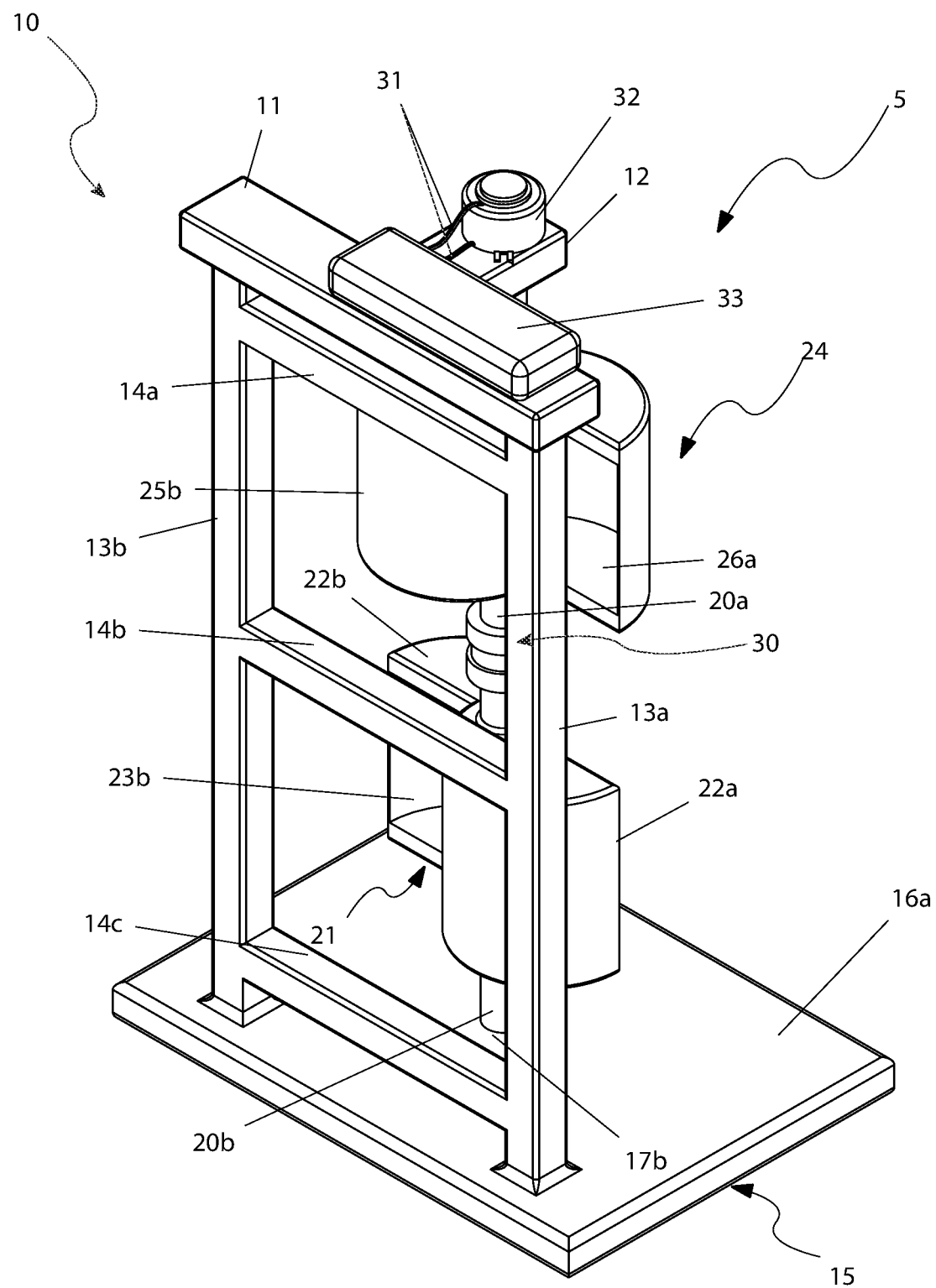
FIG. 2 is a top rear left perspective view of the wind generator 5, according to a preferred embodiment of the present device.
Figure 3:
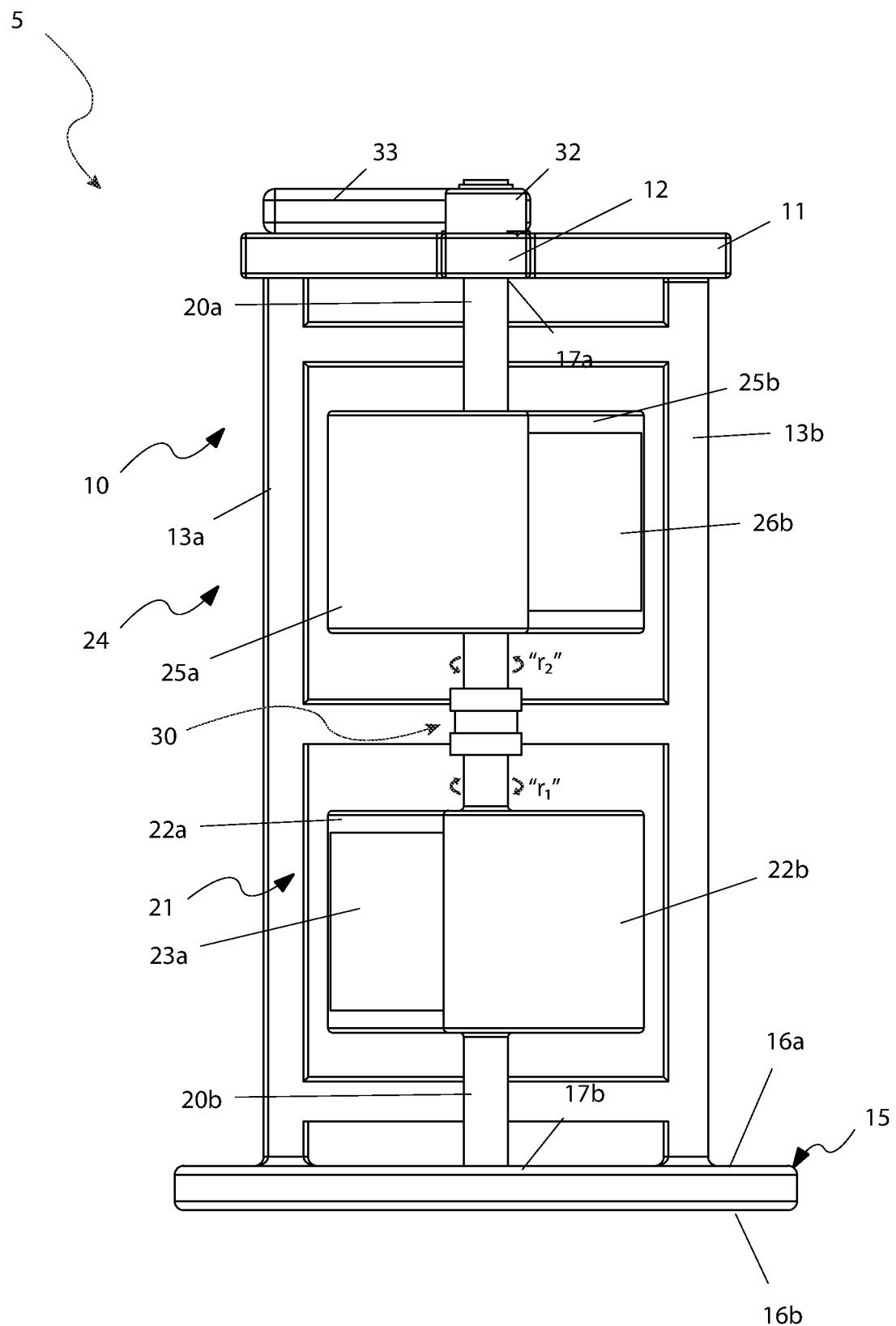
FIG. 3 is a front elevation view of the wind generator 5, according to a preferred embodiment of the present device.
Figure 4:
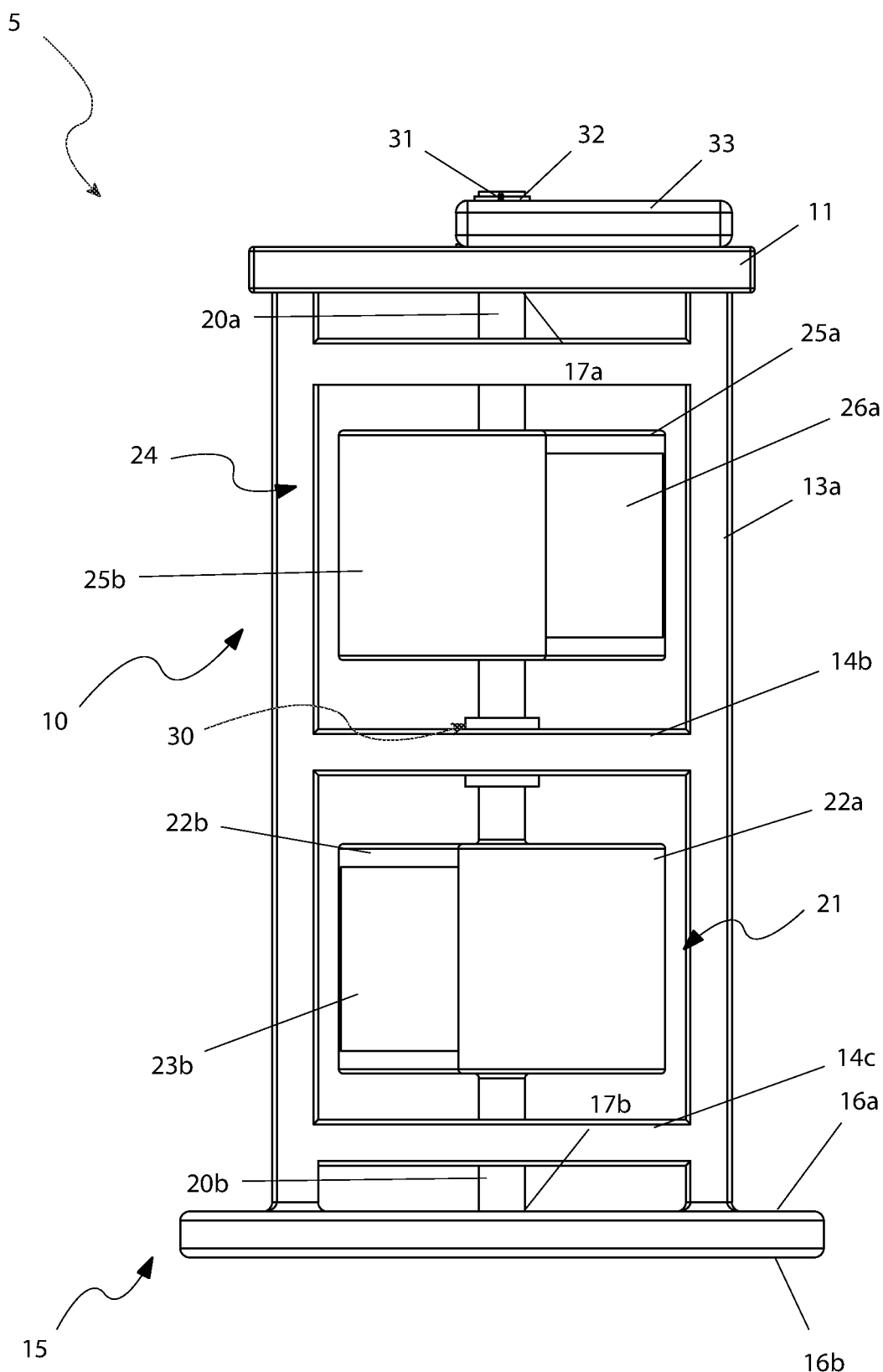
FIG. 4 is a rear elevation view of the wind generator 5, according to a preferred embodiment of the present device; and, FIG. 5 is a top plan view of the wind generator 5, according to a preferred embodiment of the present device.
Figure 5:
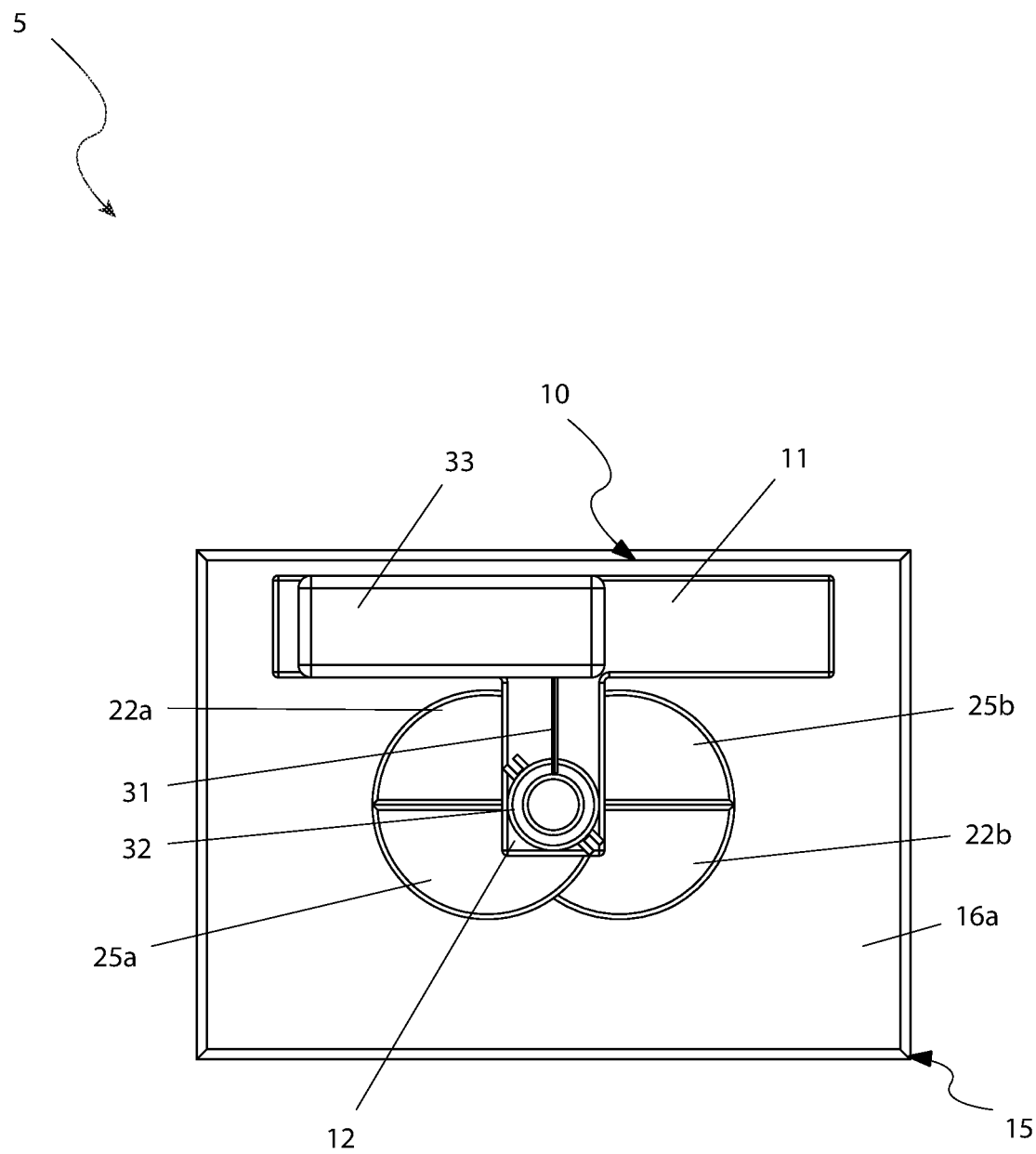

DESCRIPTIVE KEY 5 wind generator
10 vertical support structure
11 top frame
12 extension
13a first frame upright
13b second frame upright
14a first frame crossmember
14b second frame crossmember
14c third frame crossmember
15 base
16a base upper surface
16b base lower surface
17a extension aperture
17b base aperture
20a shaft upper half 20b shaft lower half
21 lower vane
22a lower vane first half
22b lower vane second half
23a lower vane first capture
23b lower vane second capture
24 upper vane
25a upper vane first half
25b upper vane second half
26a upper vane first capture
26b upper vane second capture
30 generator
31 wiring
32 slip ring
33 battery 1. Description of the Device The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring to FIGS. 1-5, the device generally comprises a multi-directional wind generator 5, and more particularly, comprises a wind turbine that has an enhanced energy production when compared to conventional turbines and is fashioned as a desktop or pilot device capable of being upscaled. The wind generator 5 generally includes a vertical support frame 10, balanced on and secured to a base 15, that supports a generator 30 in electrical communication with a lower vane 21 installed upon a rotating shaft lower half 20b, and an upper vane 24 installed upon an opposing rotating shaft upper half 20a.

The base 15 is generally planar and rectangular, although other shapes can be envisioned, and further has a base upper surface 16a and a base lower surface 16b. The base 15 may have feet or other support structure located on the base lower surface thereof 16b. A first frame upright 13a and second frame upright 13b each have a bottom end that is attached or otherwise affixed to a rear top corner of the base upper surface 16a and are coextensive and disposed parallel with each other. Attached to top ends of the first frame upright 13a and second frame upright 13b is a top frame 11 that spans the distance between the first frame upright 13a and second frame upright 13b and is attached or otherwise affixed thereto. An extension 12 extends forwardly from the top frame 11 at a central location thereof. A first frame crossmember 14a, a second frame crossmember 14b, and a third frame crossmember 14c each have terminal ends attached to opposing inner sides of the first frame upright 13a and second frame upright 13b to provide structural rigidity thereto.

Rotatably attached to an extension aperture 17a, located at a bottom side of the extension 12 near the terminal end thereof, is a top end of a shaft upper half 20a. The shaft upper half 20a is independently rotatable relative to the extension 12 and may have a bearing assembly to accomplish this. Rotatably attached to a base aperture 17b located on the base upper surface 16a, horizontally parallel with the extension aperture 17a, is a bottom end of a shaft lower half 20b. The shaft lower half 20b is independently rotatable relative to the base 15 and may have a bearing assembly to accomplish this.

The first vane 21 is mounted to the shaft lower half 20b and is capable of rotating therewith. A second vane 24, generally identical in shape as the first vane 21, is mounted to the shaft upper half 20a and is capable of rotating therewith. The first vane 21 is mounted on the shaft lower half 20b in such a way as to be diametrically opposite the mounting position of the second vane 24 on the shaft upper half 20a. The first vane 21 includes a first vane first half 22a that is semicircular and has a first vane first capture 23a located on the flattened side of the first vane first half 22a that is capable of capturing wind flow such that the first vane 21 can rotate the shaft lower half 20b in a first direction "r1". The first vane 21 also includes a first vane second half 22b that is also semicircular and has a first vane second capture 23b located on the flattened side of the first vane second half 22b that is capable of capturing wind flow such that the first vane 21 can also rotate the shaft lower half 20b in a first direction "r1".

The second vane 24 includes a second vane first half 25a that is semicircular and has a second vane first capture 26a located on the flattened side of the second vane first half 25a that is capable of capturing wind flow such that the second vane 24 can rotate the shaft upper half 20a in a second direction "r2". The second vane 24 also includes a second vane second half 25b that is also semicircular and has a second vane second capture 26b located on the flattened side of the second vane second half 25b that is capable of capturing wind flow such that the second vane 24 can also rotate the shaft upper half 20a in a second direction "r2".

The first vane 21 and second vane 24 are coupled to each other with a generator 30, comprising a set of moving magnets and multiple coils. The magnets and coils of the generator 30 are in electrical communication, via wires 31 routed through the shaft upper half 20a and secured with a slip ring 32 located on the top of the extension 32, to a battery 33 that is mounted to the top frame 11. Thus, when any wind flow is captured by either vane 21, 24, the magnets move within the coils, thus enabling the generator 30 to produce electrical power. The first vane 21 can be vertically adjusted along the shaft lower half 20b, and the second vane 24 can be vertically adjustable along the shaft upper half 20a as necessary to enhance the efficient capture of the wind flow. In certain embodiments, the magnets are attached to the shaft lower half 20b and the coils are attached to the shaft upper half 20a. As such, the first vane 21 and shaft lower half 20b will rotate in a first direction "r1" which is counter to the second vane 24 and shaft upper half 20a rotation direction "r2".

At least one specific embodiment of the wind generator 5, consists of a comprehensive arrangement of components designed for optimized functionality. This embodiment consists of a sturdy base 15 with a base upper surface 16a and base lower surface 16b, which supports a vertical support structure 10. The vertical support structure is formed by first frame upright 13a and second frame upright 13b, linked by a top frame 11, from which an extension 12 projects. The structural integrity of this assembly is enhanced by three frame crossmembers, specifically a first frame crossmember 14a, a second frame crossmember 14b, and a third frame crossmember 14c. A rotating shaft is divided into an upper half 20a and a lower half 20b, each featuring apertures, extension aperture 17a and base aperture 17b respectively, that facilitate rotation. Attached to these shaft halves are two semicircular vanes; the lower vane 21 has a first half 22a and a second half 22b, each equipped with wind-capturing features 23a and 23b. Similarly, the upper vane 24, comprising a first half 25a and a second half 25b, has capturing features 26a and 26b designed to rotate in response to wind. The generator 30 is electrically linked through wiring 31 to a battery 33, with a slip ring 32 ensuring continuous connectivity amidst rotational movements. This configuration not only underscores the wind generator's potential in varying operational scales but also its adaptability to enhance energy production efficiently.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A wind generator consisting of:
   a base having a base upper surface and a base lower surface;
   a vertical support structure consisting of a first frame upright and a second frame upright each extending upward from the base upper surface, a top frame extending between top ends of the uprights, and a forwardly projecting extension centrally attached to the top frame;
   a base aperture extending through the base upper surface and an extension aperture extending through a lower side of the extension, the base aperture and extension aperture being horizontally aligned;
   a rotating shaft consisting of a shaft lower half and a shaft upper half, the shaft lower half being rotatably received in the base aperture and the shaft upper half being rotatably received in the extension aperture, the shaft lower half and shaft upper half being coaxial and rotatable in opposite directions about a common axis;
   a lower vane mounted to the shaft lower half, the lower vane consisting of a first semicircular lower vane half and a second semicircular lower vane half, each semicircular lower vane half having a flattened side and a curved side, each flattened side including a wind-capturing feature disposed thereon and configured to direct wind flow to rotate the shaft lower half in a first rotational direction;
   an upper vane mounted to the shaft upper half above the lower vane, the upper vane consisting of a first semicircular upper vane half and a second semicircular upper vane half, each semicircular upper vane half having a flattened side and a curved side, each flattened side including a wind-capturing feature disposed thereon and configured to direct wind flow to rotate the shaft upper half in a second rotational direction opposite the first rotational direction;
   a generator mechanically and electrically coupled between the shaft lower half and the shaft upper half, the generator consisting of a plurality of magnets mounted on the shaft lower half and a plurality of coils mounted on the shaft upper half such that counter-rotation of the shaft halves produces relative motion between the magnets and the coils to generate electrical current;
   wiring extending from the generator through the shaft upper half and in electrical communication with a slip ring mounted on the extension;
   a battery mounted to the top frame and in electrical communication with the slip ring through the wiring to store electrical energy generated by the generator; and,
   wherein the flattened sides of the lower vane halves are oriented in opposed alignment relative to the flattened sides of the upper vane halves such that wind acting on either vane induces counter-rotation of the shaft halves; and,
   wherein the lower vane is vertically adjustable along the shaft lower half and the upper vane is vertically adjustable along the shaft upper half to optimize wind capture efficiency.

* * * * *